US007054616B2

(12) United States Patent
Rickhoff et al.

(10) Patent No.: US 7,054,616 B2
(45) Date of Patent: May 30, 2006

(54) METHOD FOR PAIRING THE COMPONENTS OF AN AUTHENTICATION DEVICE, AND AN AUTHENTICATION DEVICE

(75) Inventors: Dieter Rickhoff, Ascheberg (DE); Thomas Kaiser, Solingen (DE); Martin Degener, Bochum (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 245 days.

(21) Appl. No.: 10/851,723

(22) Filed: May 21, 2004

(65) Prior Publication Data

US 2004/0248556 A1 Dec. 9, 2004

(30) Foreign Application Priority Data

Jun. 4, 2003 (DE) ................................ 103 25 089

(51) Int. Cl.
*H04M 1/66* (2006.01)

(52) U.S. Cl. .......................... 455/411; 455/410; 455/88

(58) Field of Classification Search ................ 455/410, 455/411, 414.1, 418, 419, 420, 88, 92; 380/247, 380/281, 284
See application file for complete search history.

(56) References Cited

U.S. PATENT DOCUMENTS

| | | | | |
|---|---|---|---|---|
| 5,491,471 | A * | 2/1996 | Stobbe | 340/5.61 |
| 6,323,566 | B1 * | 11/2001 | Meier | 307/10.2 |
| 6,437,683 | B1 | 8/2002 | Wolf et al. | |
| 6,538,560 | B1 | 3/2003 | Stobbe et al. | |
| 6,714,119 | B1 | 3/2004 | Mindl et al. | |
| 6,961,541 | B1 * | 11/2005 | Overy et al. | 455/41.2 |
| 2002/0014953 | A1 | 2/2002 | Stephens et al. | |
| 2002/0089429 | A1 | 7/2002 | Alessandro | |
| 2003/0071714 | A1 | 4/2003 | Bayer et al. | |
| 2003/0129949 | A1 * | 7/2003 | Selektor | 455/88 |
| 2005/0041813 | A1 * | 2/2005 | Forest et al. | 380/262 |

FOREIGN PATENT DOCUMENTS

| | | | |
|---|---|---|---|
| DE | 41 34 922 | C1 | 12/1992 |
| DE | 197 28 761 | C1 | 7/1997 |
| DE | 199 56 908 | A1 | 11/1999 |
| DE | 100 04 615 | A1 | 2/2000 |
| FR | 2 834 156 | | 12/2001 |
| WO | WO 99/44114 | A1 | 2/1999 |
| WO | WO 01/62016 | A2 | 2/2001 |
| WO | WO 01/99369 | A2 | 6/2001 |

* cited by examiner

*Primary Examiner*—Congvan Tran
(74) *Attorney, Agent, or Firm*—Brooks Kushman P.C.

(57) ABSTRACT

A method for pairing an identification (ID) transmitter and a base of an authentication device includes a programmer initializing the base by transferring an assigned base identification and a code to the base via a first link. The first link differs from a control link used by the ID transmitter to communicate a code to the base. The base then initializes the ID transmitter by transferring to the ID transmitter via a second link an assigned ID transmitter identification which corresponds to the base identification of the ID transmitter and the code. The second link differs from the other links. The ID transmitter is initialized in order to receive authentication from the base to cause the base to trigger an object assigned to the base when the ID transmitter has an ID transmitter identification corresponding to the base identification and communicates the code to the base via the control link.

20 Claims, 2 Drawing Sheets

METHOD FOR PAIRING THE COMPONENTS OF AN AUTHENTICATION DEVICE, AND AN AUTHENTICATION DEVICE

CROSS-REFERENCE TO RELATED APPLICATIONS

This application claims foreign priority benefits under 35 U.S.C. § 119 of foreign application DE 103 25 089.1 filed on Jun. 4, 2003.

BACKGROUND OF THE INVENTION

1. Field of the Invention

The present invention relates to a method for pairing the components of an authentication device having one or more mobile identification (ID) transmitters which serve as keys and having at least one base station assigned to an object. The present invention also relates to an authentication device having one or more mobile ID transmitters serving as keys, at least one base station assigned to an object, and a programming unit.

2. Background Art

Authentication devices serve to query an authorization in order to trigger a certain action by an identification (ID) transmitter if the ID transmitter gets within the range of a base station. Authentication devices are used, for example, to check the access authorization of a person carrying a mobile ID transmitter, for example, with regard to entry into a building or something similar. Authentication devices are also used to monitor a flow of goods. In this case, an ID transmitter is assigned to an individual item of goods or a batch, such as a palette, to monitor whether and possibly when the goods leave a warehouse, for example.

Keyless access authorization control devices include a reader (i.e., a base station) assigned to an object to be monitored and one or more ID transmitters. The object, for example, may be a door, a gate, or something similar. The ID transmitters are transponders. Query communication between an ID transmitter and the base station in order to authenticate the ID transmitter during the control operation of the access authorization control device may take place on a radio-frequency (RF) link, for example.

There are such systems which carry out unidirectional communication between the ID transmitter and the base station in order to authenticate the ID transmitter. Other such systems carry out bidirectional communication between these two elements to perform authentication. Authentication involves the ID transmitter transmitting stored data to the base station, and then the base station checking this data with regard to authorization. If the data indicates that the ID transmitter is authenticated, then the base station grants authorization to the ID transmitter and opens the object such as a door being monitored by this base station. Usually the communicated stored data includes a cryptic key such as a crypt code.

Access authorization control devices are known in which the ID transmitters and the readers are programmed or initialized by the manufacturer in a customer and object-specific way by storing a certain identification in the ID transmitters and the readers. The alignment or association of the individual components with one another is called "marriage" or "pairing". Thus, when these access authorization control devices are used, it must be known before they are put into operation how many ID transmitters serving as keys and how many readers are needed. It also has to be known which ID transmitters should be recognized by which readers as having access authorization to an object. There is no problem as long as all parameters are known before the functional marriage or pairing of the individual components by the above-described measures. However, in case the number of ID transmitters or readers assigned to an object has to be increased or changed, all components (ID transmitters and readers) of the access authorization control device have to be remarried or paired with one another. The same goes for the case when individual ID transmitters are lost and have to be replaced by new ones.

DE 41 34 922 C2 discloses a system for controlling access to objects in which the readers are programmed by the ID transmitters. This makes possible the use of un-programmed readers so that it may be possible to expand an object by using more readers. However, in this system the manufacturer still pre-programs the ID transmitters. Thus, when adding ID transmitters to this system the user is still dependent on the manufacturer. In particular, this system can realize hierarchical closing structures only with difficulty, because each ID transmitter is also simultaneously a data carrier, and thus in theory each reader is capable of programming.

SUMMARY OF THE INVENTION

Starting from the discussed state of the art, the present invention is based on the task of further developing a method of the type mentioned in the discussed state of the art in such a way that an authentication device, for example, a keyless access authorization control device, can be set-up using simple measures with greater variability with respect to the use and the number of readers, and with respect to the use and the number of identification (ID) transmitters.

The method of the present invention generally includes two initialization steps for pairing the components of an authentication device having at least one base station, at least one ID transmitter, and a mobile programming unit. The first initialization step involves the mobile programming unit initializing the base stations. The programming unit initializes the base stations by communicating with the base stations over a programming data transmission link. The programming data transmission link is intended for communication between the programming unit and the base stations during the programming or initialization operation of the authentication device. This programming data transmission link differs from a control data transmission link which the base stations and the ID transmitters use to communicate with one another during the control operation of the authentication device. The first initialization step further includes the programming unit assigning an individual identification to the base station, and the programming unit transmitting a crypt code to the base station if a crypt code is not yet known to the base station. The base station uses the crypt code to determine if the ID transmitters have authentication during the control operation of the authentication device.

The second initialization step involves a base station initializing the ID transmitters. The base station initializes the ID transmitters by communicating with the ID transmitters over a programming data transmission link. Again, this programming data transmission link differs from the control data transmission link which serves for communication between the ID transmitters and the base stations during the control operation of the authentication device.

The ID transmitters that are initialized for intended communication with this base station are those which are supposed to be granted authorization to trigger an event by this base station. Such an event may be the opening of a door of the object. This second initialization step further involves the base station assigning to each of these ID transmitters an individual identification, and then the base station transferring to the ID transmitters the crypt code serving for communication between the base stations and the ID transmitters, if a crypt code is not yet known to the ID transmitters.

The method for the functional marriage or pairing of the components of an authentication device such as the marriage of one or more readers (i.e., one or more base stations) with those ID transmitters which should be recognized as authorized by one or more of the base stations participating in the authentication device involves the following. When the components (i.e., the base stations and the ID transmitters) are uninitialized, the crypt code used for operation of the authentication device is known only to the mobile programming unit. As such, the crypt code is known only to a single element of the authorization device. During initialization of the authentication device, this programming unit, which is also called the master, transfers this crypt code to each base station. When the crypt code is transferred to each base station—a process which is performed at every base station—every individual base station is defined and identified. Thus, all base stations assigned to a programming unit receive their individual identification in this way.

The programming unit is an element of the authorization device, so that it is simple, as in a reinitialization of a base station in an object, to expand by adding other base stations. The base stations only need to be initialized by the programming unit in the described manner. The base stations initialize the ID transmitters belonging to the authentication device in the second initialization step.

This second initialization step involves this base station initializing or programming all ID transmitters that should be recognized as authorized by this base station. This second initialization step includes the base station transferring to the ID transmitters the crypt code that was transferred in the preceding first initialization step from the programming unit to the base station. However, the base station only transfers the crypt code to an ID transmitter if it has previously been recognized in a query that this ID transmitter has not yet received any crypt code, or at least does not know the crypt code serving for communication of this base station during the control operation of the authentication device.

The base station then assigns and transfers individual identifications to each of the ID transmitters. The base station and an ID transmitter use the individual identification, with the specified crypt code, to perform the authentication control for an object. If the ID transmitter already has the crypt code used for this object, then the base station only transfers the assigned individual identification to the ID transmitter. This is the case, for example, if this ID transmitter has previously been initialized by another base station with regard to transferring the crypt code, and the programming on each other base station serves the purpose of making this ID transmitter known to this base station with regard to its authorization.

The initialization or programming of each ID transmitter by one or more base stations of the authentication device makes clear that for the configuration of the authentication device exclusively unprogrammed ID transmitters are needed. The same goes for the use of the base stations that are needed, which are in turn initialized and programmed by the programming unit, as described above. Thus, the elements of the access authorization control device can be taken from mass production. The elements are only individualized once these elements are functionally married or paired with one another in the described manner with the help of a programming unit. Consequently, it is not a problem to add base stations, and it is simple to add other ID transmitters to the authentication device, and above all lost ID transmitters can also be replaced by new ones. This process is especially suitable in a keyless access authorization control device.

The method of the present invention provides that a different data transmission link is used for initializing and programming the individual elements during a programming operation of the authentication device than the data transmission link which is intended for use during a control operation of the authentication device. In the control operation of the authentication device, communication between the base station and the respective ID transmitter expediently takes place over a radio-frequency (RF) data transmission link. By contrast, the initialization, that is programming, of the individual ID transmitters by the base stations takes place over an audio frequency data transmission link.

In such a design, each ID transmitter has an audio frequency section and a RF section. However, it is expedient if the audio frequency link, and thus the audio frequency section of the ID transmitter, is also used by the base station to wake the ID transmitter from a sleep or resting mode. Waking the ID transmitter causes the ID transmitter to switch to the control operating mode. In the control operating mode, the RF section of the ID transmitter communicates with a base station in order to perform the authentication queries.

For waking ID transmitters, a base station cyclically transmits an audio frequency waking signal. The range of such a waking signal is limited and depends on the spatial conditions in the vicinity of the base station. In every case an attempt will be made to transmit the waking signal with such a field strength that an approaching ID transmitter is awakened at a sufficient distance in front of the base station, and communication then commences between the base station and the ID transmitter on the RF link if the ID transmitter is located near the object, such as a door for example, controlled by the base station.

To program the ID transmitter on the audio frequency link, it is expedient to transfer data on the audio frequency link with only a very weak field strength. To accomplish this the ID transmitter is kept in the immediate vicinity of the base station. The field strength can be changed by the different operating mode of the base station—programming or initialization mode, and control operation mode.

The audio frequency link for communication between the programming unit and the base station to initialize and program the base stations is also a short-range communication link. Programming or initialization of the base stations by the programming unit can also be provided over another link, for example an infrared link, or it can involve contact.

The programming unit itself is mobile in order that it can be moved amongst the individual base stations that have a distributed arrangement in an object. Therefore, the method of the present invention does not require that the base stations be networked with one another. Further, the programming unit itself does not have to be actively programmable. Instead, the individual base stations can be programmed by the programming unit itself. It is expedient if this programming unit is then designed to work as an active transponder. Therefore, the programming unit can be designed to be as small as the individual ID transmitters.

However, it is expedient for the programming unit to differ from the individual ID transmitters in color or in some other way.

In the method of the present invention, it is expedient if, after initialization of a base station and after initialization of the ID transmitter to be recognized as authorized by this base station, there is feedback to the programming unit about the initialization that has been performed. It is then possible for the programming unit to block the identification assigned to this base station from being assigned to another base station, which would otherwise be possible. Here it is expedient if the feedback to the programming unit contains the information that the base station has been initialized the way it is supposed to be, and information about how many ID transmitters are recognized as authorized by this base station. It is then possible for the programming unit to manage the ID transmitter and the base because in this case the programming unit knows the identifications of all base stations and all ID transmitters participating in the authentication device.

It is expedient to use one counter for identification of the base stations and one counter for identification of the individual ID transmitters, namely a base station counter and an ID transmitter counter. This has the advantage, among others, that only a small amount of memory is required for storing information regarding the individual elements, and especially also that access to authorization data that might be assigned to an ID transmitter is possible much more quickly than would be the case if it were necessary to search the entire memory for the identification of an ID transmitter, for example. In this case, the use of a counter serves as a key or address to gain access to other data that might be available.

In addition to the mobile passive programming unit which it is expedient to provide, it is simple for such an access authorization control device also to have an active programming unit assigned to it. This active programming unit makes it possible to delete certain authorizations in the individual base stations, in case an ID transmitter is lost, for example. Such an active programming unit makes it possible to program the base stations with regard to the authorization levels of the individual ID transmitters. This data stored in the base station with regard to the authorization of the ID transmitters known to this base station can contain, for example, a time-dependent authorization in the framework of a keyless access authorization control device, according to which certain ID transmitters are admitted into an object as authorized only within a certain time period, for example. Authorization levels can also be designed in such a way that, for example, access is granted, in the framework of an access authorization control device, to a certain ID transmitter only if another ID transmitter in addition to this ID transmitter is set-up in the area of communication of the base station.

One may combine the method and the authentication device of the present invention with or superimpose them on other known systems. It is also simple to establish hierarchical closing structures or use an additional object identification as a part of the individual identifications in order to distinguish different objects which work with the same crypt code from one another. In such a case it is expedient to use, for each object, a programming unit, which is expediently a passive programming unit, containing the same crypt code, however programmed with an additional object identification. It is also possible to use different crypt codes for different objects. However, in this case, the ID transmitters participating in the entire authentication device would have a corresponding number of different crypt codes available. Even if this is possible in theory, it has to be taken into account that, as a rule, this would have the consequence of prolonging the duration of the authorization query dialog, if the awoken ID transmitter does not by chance answer with the crypt code appropriate for this object.

BRIEF DESCRIPTION OF THE DRAWINGS

The present invention is described below using a sample embodiment which makes reference to the attached figures. The figures are as follows.

DETAILED DESCRIPTION OF THE PREFERRED EMBODIMENT(S)

Figure 1:
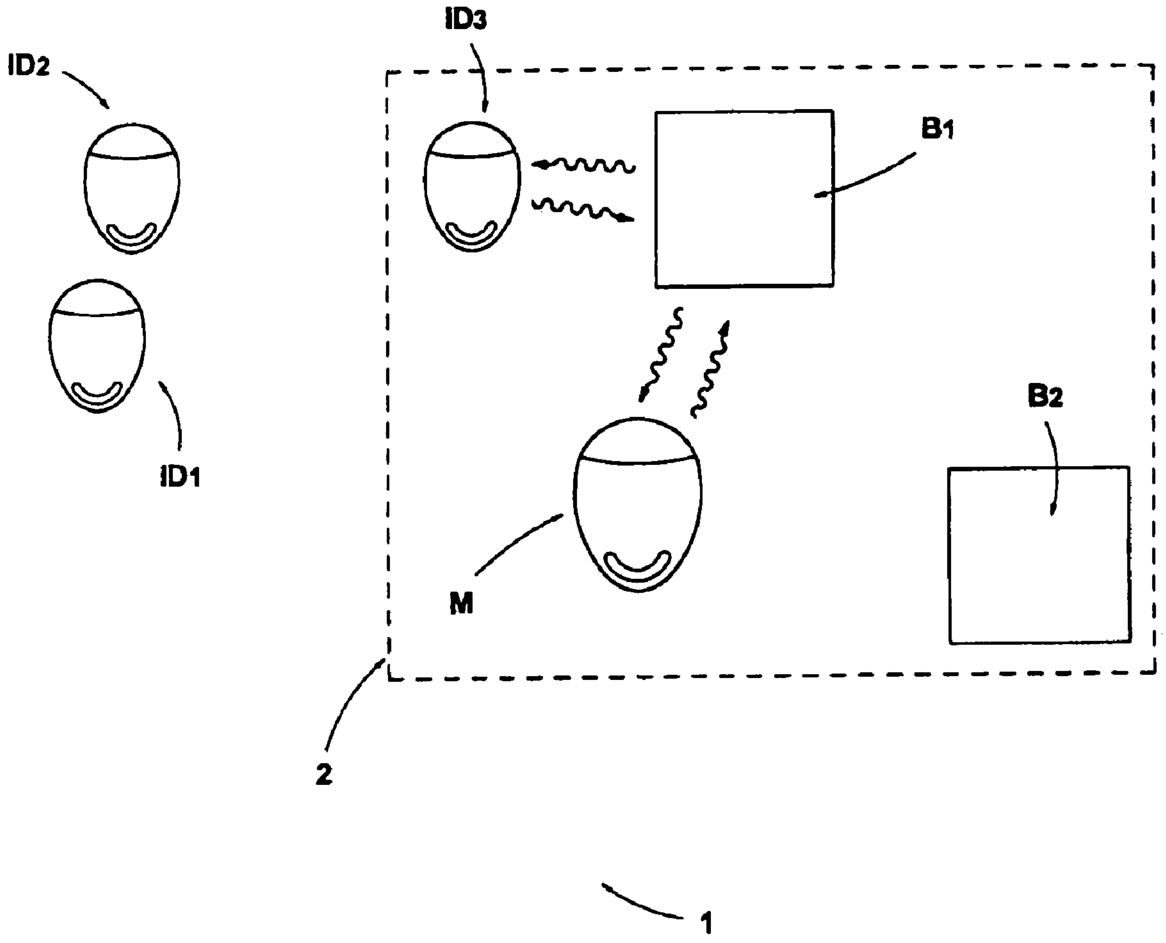
FIG. 1 illustrates a schematic diagram of a keyless access authorization control device in accordance with the present invention.

A keyless access authorization control device 1 includes one or more base stations B1, B2; one or more ID transmitters ID1, ID2, ID3; and a master mobile programming unit M. Base stations B1, B2 are assigned to, for example, a door of object 2. Base stations B1, B2 serve the purpose, in the operation of access authorization control device 1, of unlocking the door assigned to the respective base station B1, B2. Base stations B1, B2 may be operable to open the door using a motor when they detect an ID transmitter defined as authorized. In the context of access authorization control device 1, ID transmitters ID1, ID2, ID3 serve as mobile keys, which can communicate with base stations B1, B2 on a radio frequency (RF) data transmission link to perform the authentication query during the control operation of the authentication control device. ID transmitters ID1, ID2, ID3 are mobile transponders.

Authentication query communication between ID transmitters ID1, ID2, ID3 and base stations B1, B2 takes place using the assistance of a crypt code. ID transmitters ID1, ID2, ID3 and base stations B1, B2 are identified with individual identification in order to make it possible to assign ID transmitters ID1, ID2, ID3 different authorizations to use base stations B1, B2. To accomplish this, base stations B1, B2 must be functionally married or paired with those ID transmitters ID1, ID2, ID3 which should be recognized as authorized by each of base stations B1, B2, so that when these base stations detect an ID transmitter that is recognized as authorized, these base stations unlock the desired door or open it with a motor.

Programming unit M marries or pairs the components (base stations and ID transmitters) of access authorization control device 1. Programming unit M is a mobile passive programming unit. Programming unit M is slightly larger than ID transmitters ID1, ID2, ID3 and its housing is identified by a different color. Among other things, programming unit M has stored in it, on an electronic memory medium, a crypt code with which the bidirectional communication between a base station B1, B2 and an ID transmitter ID1, ID2, ID3 should take place. Programming unit M also contains two counters: a base station counter and an ID transmitter counter. Programming unit M and base stations B1, B2 communicate among one another on an audio frequency data transmission link. The range of this audio frequency communication link is limited to a few centimeters. Thus, communication is possible between programming unit M and one of base stations B1, B2 if the programming unit is held against a base station B1, B2.

Base stations B1, B2 and also ID transmitters ID1, ID2, ID3 each include a RF transceiver section to perform bidirectional communication during access authorization control operation of access authorization control device 1. Base stations B1, B2 also include an audio frequency transceiver section. ID transmitters ID1, ID2, ID3 also include an audio frequency receiver section. Programming, that is initialization, of ID transmitters ID1, ID2, ID3 is done by base stations B1, B2 on the audio frequency data transmission link. Activation signals are transmitted as feedback from ID transmitters ID1, ID2, ID3 to the respective base station B1, B2 on the RF data transmission link. Such feedback or acknowledgment signals can also be transmitted on the audio frequency data transmission link. In such a case, ID transmitters ID1, ID2, ID3 also include an audio frequency transmitter.

Base stations B1, B2 and ID transmitters ID1, ID2, ID3 come from mass production, and before their functional marriage or pairing with one another and their assignment to object 2 they have no individual characteristics which would be necessary in the framework of the description of the present invention. Thus, before their initialization, these elements—the base stations and the ID transmitters—can be assigned to any access authorization control device 1 or to any object.

Figure 2:
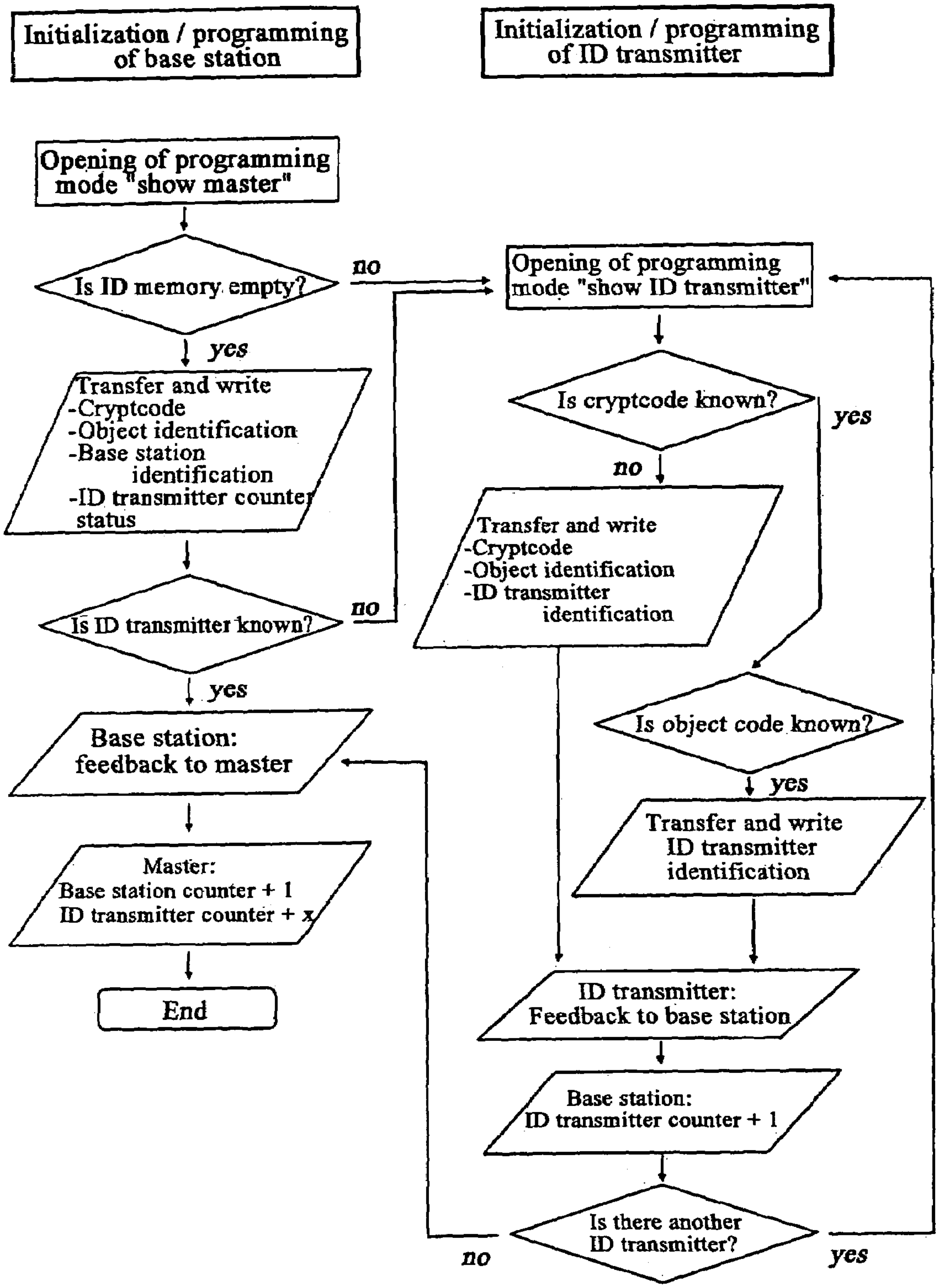
FIG. 2 illustrates a flow diagram representing the method in accordance with the present invention for the functional marriage or pairing of the components of the keyless access authorization control device shown in FIG. 1.

The process for initializing and programming the individual elements of access authorization control device 1 by programming unit M is described below with reference to the flow diagram in FIG. 2. To initialize a base station, in this case base stagion B1, programming unit M is held in the immediate vicinity of base station B1 so that the programming unit can communicate with base station B1 on an audio frequency link. To accomplish this, programming unit M is held directly against base station B1. When programming unit M enters into the audio frequency transmission area of base station B1 it wakes up and transmits to base station B1 a first signal. The first signal opens the programming or initialization mode of base station B1. This programming mode allows bidirectional communication between programming unit M and base station B1 to take place over the audio frequency data transmission link.

In a first query, programming unit M checks whether base station B1 has already received an individual identification. This can be done by querying an identification memory, for example. If the memory is empty, the base station—in this case base station B1—is not functionally assigned to either object 2 or to access authorization control device 1. In this case, programming unit M transfers to base station B1 a base station identification, an object identification, and a crypt code. All transferred data are stored in base station B1. It is expedient for the transferred crypt code to be stored on a different storage medium than the base station identification and the object identification.

In the sample embodiment shown, the base station identification is an element of a series of counter values. For example, if when access authorization control device 1 is initialized the first base station to be initialized and programmed is B1, then this base station gets counter element "1" as its base station identification. The object identification that is transferred represents a suitable identification for object 2. After the mentioned data has been successfully transferred from programming unit M to base station B1 and stored there, feedback occurs from base station B1 to programming unit M. The base station counter of programming unit M is then incremented by one, so that the first counter value cannot be assigned again. Thus, the base station identification of the next base station to be programmed and initialized, for example base station B2, is unambiguously specified with the next counter value. This base station receives the next counter value, which in the sample embodiment described is the counter element "2". In theory, after the feedback from base station B1 to programming unit M, the programming of base station B1 is ended. Removing programming unit M from base station B1 switches base station B1 from its programming mode to its access authorization control operation mode.

Programming and initialization of other base stations of access authorization control device 1, for example base station B2, is done in an analogous manner.

For the case that in direct connection with the programming of a base station, for example base station B1, it is intended that the ID transmitters which this base station B1 should recognize as authorized be programmed and initialized simultaneously, such an ID transmitter, for example ID transmitter ID3, should also be brought into the immediate vicinity to base station B1. Before the feedback is transmitted from base station B1 to programming unit M, a query is made whether or not an ID transmitter should be initialized. For the case that at the point in time of this query an ID transmitter, for example ID transmitter ID3, is in the immediate vicinity of base station B1, this feedback has not yet been transmitted from base station B1 to programming unit M. Instead, ID transmitter ID3 is programmed, that is initialized, by base station B1, and then this is done with other ID transmitters, if applicable.

This communication between base station B1 and ID transmitter ID3 takes place on an audio frequency link. When ID transmitter ID3 comes within close range of base station B1 it wakes up and is switched into its programming mode. In theory, ID transmitter ID3 is programmed by base station B1 in the same way base station B1 is programmed by programming unit M.

In the sample embodiment shown, a first query establishes whether the crypt code stored in base station B1 is known to ID transmitter ID3. This query can involve reading the crypt code memory of ID transmitter ID3, for example. If the crypt code memory of ID transmitter ID3 is empty, ID transmitter ID3 has neither been programmed nor initialized up to now. Thus, ID transmitter ID3 is a new ID transmitter.

In this case, the next thing that happens is that base station B1 transfers the crypt code, the object identification, and an ID transmitter identification to ID transmitter ID3. To accomplish this, base station B1 has an ID transmitter counter, which in theory works as the previously described base station counter of programming unit M. If ID transmitter ID3 is the first ID transmitter which should be programmed as authorized to have access to this base station B1, then it receives ID transmitter identification "1". The next ID transmitters to be programmed by base station B1 in the framework of this programming process, for example ID transmitters ID1, ID2, then successively receive the following elements of this counter series, namely ID transmitter identifications "2" and "3".

If the mentioned data has been transferred to ID transmitter ID3 and stored in it the way they it is supposed to be, then ID transmitter ID3 transmits feedback to base station B1. The ID transmitter counter of base station B1 is then incremented by one. If other ID transmitters are supposed to be initialized by base station B1, that is programmed as being authorized to have access, then they are brought into the close-range area of base station B1 one after the other and initialized, that is programmed, in the same way.

Once the ID transmitter programming, that is initialization, is completed, base station B1 transmits the feedback from ID transmitter ID3 to programming unit M. This feedback also contains information about the number of ID transmitters set-up by base station B1 in the framework of the preceding initialization, that is programming. Programming unit M includes an ID transmitter counter, which is set by this feedback. For example, if the three ID transmitters ID1, ID2, ID3 have been initialized and programmed by base station B1, then the counter of programming unit M is at position "4". Removing programming unit M from base station B1 concludes the programming process and access authorization control device 1 switches over to its access authorization control mode.

If object 2 has several base stations, as is the case in the depicted embodiment, then when a base station is programmed the value of the "ID transmitter counter" of programming unit M is also transmitted to it, so that when ID transmitter ID3 is programmed as being authorized to have access to base station B2, it would receive counter element "4", for example, as its ID transmitter identification. This makes it possible to recognize every authorization from the ID transmitter identification. Every ID transmitter receives, when it is programmed for access authorization to several base stations, for example base stations B1 and B2, an identification that is independent for each base station B1 or B2. This means that it is not necessary to construct complicated composite identification codes to identify the individual ID transmitters ID1, ID2, ID3.

When an ID transmitter is being programmed, if the first query about whether it knows the crypt code provided for object 2 establishes that the crypt code memory of the ID transmitter is not empty, and if the crypt code stored in the ID transmitter coincides with that stored in the base station, then this ID transmitter that is being programmed is one that has already previously been initialized by another base station of the object.

Another object-related query then asks whether object 2 is already known to this ID transmitter. If object 2 is already known as such to the ID transmitter by storing a corresponding identification, this ID transmitter being programmed is obviously one that has already been initialized, and possibly programmed, by another base station of this object 2. Consequently, this is an ID transmitter that should be recognized by other base stations of object 2 as authorized to have access. In this case, an ID transmitter identification for this other base station is assigned to the ID transmitter and transferred to the ID transmitter. After the ID transmitter has sent feedback to the base station, the counter value of the base station is correspondingly incremented.

The rest of the process corresponds to that previously described, to conclude the programming process.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

LIST OF REFERENCE SYMBOLS

1 Keyless access authorization control device

2 Object $B_1$, $B_2$ Base stations $ID_1$–$ID_3$ ID transmitters (identification transmitters)

M Master (programming unit)

What is claimed is:

1. A method for pairing mobile identification transmitters (ID transmitters) and base stations of an authentication device, the method comprising:

a mobile programming unit initializing at least one base station by communicating with the at least one base station via a first programming data transmission link, wherein the first programming data transmission link differs from a control data transmission link used by ID transmitters to communicate a crypt code to the at least one base station in order to have the at least one base station grant authentication to the ID transmitters;

wherein the programming unit initializes the at least one base station by assigning an individual base station identification to each of the at least one base station, and then transferring the assigned individual base station identification and a crypt code to the at least one base station via the first programming data transmission link;

the at least one base station initializing at least one ID transmitter by communicating with the at least one ID transmitter via a second programming data transmission link, wherein the second programming data transmission link differs from the first programming data transmission link and the control data transmission link, the at least one ID transmitter being initialized in order to receive authentication from the at least base station to cause the at least one base station to trigger an object assigned to the at least one base station when the at least one ID transmitter has an individual ID transmitter identification corresponding to the base station identification of the at least one base station and communicates the crypt code to the at least one base station via the control data transmission link; and wherein the at least one base station initializes the at least one ID transmitter by assigning an individual ID transmitter identification corresponding to the at least one base station identification to the at least one ID transmitter, and then transferring the assigned individual ID transmitter identification and the crypt code to the at least one ID transmitter via the second programming data transmission link.

2. The method of claim 1 further comprising:

the at least one ID transmitter transmitting feedback to the at least one base station via the control data transmission link if the assigned individual ID transmitter identification and the crypt code has been received and stored by the at least one ID transmitter; and after the at least one base station receives the feedback, the at least one base station blocks reassignment of the assigned individual ID transmitter identification to other ID transmitters.

3. The method of claim 2 further comprising:

the at least one base station transmitting feedback to the programming unit if the assigned individual base station identification and the crypt code has been received and stored by the at least one base station; and after the programming unit receives the feedback, the programming unit blocks reassignment of the assigned individual base station identification to other base stations.

4. The method of claim 3 wherein:

the feedback to the programming unit contains information about the individual ID transmitter identification assigned by the base station.

5. The method of claim 1 further comprising:

using a base station counter to count the base station identifications assigned by the programming unit to the at least one base station; and using an ID transmitter counter to count the ID transmitter identifications assigned by the at least one base station to the at least one ID transmitter.

6. The method of claim 5 further comprising:

the programming unit recording a base station counter value and an ID transmitter counter value; and the programming unit transferring the next unassigned ID transmitter identification to the at least one base station during initialization of the at least one base station by the programming unit.

7. The method of claim 1 wherein:

the programming unit assigning an object identification to the object, wherein the programming unit transfers the object identification to the at least one base station via the first programming data transmission link during initialization of the at least one base station by the programming unit.

8. The method of claim 1 wherein:

the control data transmission link is a radio frequency (RF) link.

9. The method of claim 1 wherein:

the first programming data transmission link is an audio frequency link.

10. The method of claim 1 wherein:

the second programming data transmission link is an audio frequency link.

11. An authentication device comprising:

at least one mobile identification transmitters (ID transmitter);

at least one base station assigned to an object, wherein each base station and each ID transmitter has a communication device to perform communication with one another; and a transponder programming unit having a readable memory containing a crypt code and memory locations to store base station identifications and ID transmitter identifications, wherein the transponder programming unit and the base station each have a communication device to perform communication with one another;

wherein each base station has a readable memory to store a crypt code communicated to the base station by the transponder programming unit, the readable memory of each base station has memory locations to store a base station identification assigned and communicated to the base station by the transponder programming unit and to store ID transmitter identifications communicated to the base station by the transponder programming unit;

wherein each ID transmitter has a readable memory to store the crypt code assigned and communicated to the ID transmitter by a base station, the readable memory of each ID transmitter has memory locations to store an ID transmitter identification assigned and communicated to the ID transmitter by the base station, wherein the ID transmitter identification and communicated to the ID transmitter by the base station corresponds to the base station identification of the base station.

12. A method for pairing a mobile identification transmitter (ID transmitter) and a base station of an authentication device, the method comprising:

a mobile programming unit initializing the base station by communicating with the base station via a first programming data transmission link, wherein the first programming data transmission link differs from a control data transmission link used by the ID transmitter to communicate a crypt code to the base station in order to have the base station grant authentication to the ID transmitter;

wherein the programming unit initializes the base station by assigning a base station identification to the base station, and then transferring the base station identification and a crypt code to the base station via the first programming data transmission link;

the base station initializing the ID transmitter by communicating with the ID transmitter via a second programming data transmission link, wherein the second programming data transmission link differs from the first programming data transmission link and the control data transmission link, the ID transmitter being initialized in order to receive authentication from the base station to cause the base station to trigger an object assigned to the base station when the ID transmitter has an ID transmitter identification corresponding to the base station identification and communicates the crypt code to the base station via the control data transmission link; and wherein the base station initializes the ID transmitter by assigning an ID transmitter identification corresponding to the base station identification to the ID transmitter, and then transferring the ID transmitter identification and the crypt code to the ID transmitter via the second programming data transmission link.

13. The method of claim 12 further comprising:

the ID transmitter transmitting feedback to the base station via the control data transmission link if the ID transmitter identification and the crypt code has been received and stored by the ID transmitter; and after the base station receives the feedback, the base station blocks reassignment of the ID transmitter identification to other ID transmitters.

14. The method of claim 13 further comprising:

the base station transmitting feedback to the programming unit if the base station identification and the crypt code has been received and stored by the base station; and after the programming unit receives the feedback, the programming unit blocks reassignment of the base station identification to other base stations.

15. The method of claim 14 wherein:

the feedback to the programming unit contains information about the ID transmitter identification assigned by the base station.

16. The method of claim 15 further comprising:

using a base station counter to count the base station identification assigned by the programming unit to the base station; and using an ID transmitter counter to count the ID transmitter identification assigned by the base station to the ID transmitter.

17. The method of claim 16 further comprising:

the programming unit recording a base station counter value and an ID transmitter counter value; and the programming unit transferring the next unassigned ID transmitter identification to the base station during initialization of the base station by the programming unit.

18. The method of claim 12 further comprising:

the programming unit assigning an object identification to the object, wherein the programming unit transfers the object identification to the base station via the first programming data transmission link during initialization of the base station by the programming unit.

19. The method of claim 12 wherein:

the control data transmission link is a radio frequency (RF) link.

20. The method of claim 19 wherein:

the first and second programming data transmission links are audio frequency links.

* * * * *